United States Patent
Simonett

[11] Patent Number: 5,222,639
[45] Date of Patent: Jun. 29, 1993

[54] ARTICLE CARRIER RACK

[76] Inventor: B. T. Simonett, P.O. Box 2177, Vail, Colo. 81658

[21] Appl. No.: 340,803

[22] Filed: Apr. 20, 1989

[51] Int. Cl.$^5$ .............................................. B62J 7/00
[52] U.S. Cl. ....................................... 224/40; 224/39
[58] Field of Search .......... 224/42.34, 42.35, 30 R-42; 211/195; 403/104; 269/45, 71, 74, 76, 77, 78

[56] References Cited

U.S. PATENT DOCUMENTS

| | | | |
|---|---|---|---|
| 658,429 | 9/1900 | Dembinski | 224/40 |
| 702,292 | 6/1902 | Edmonds | 224/39 |
| 837,642 | 12/1906 | Powell | 403/104 |
| 2,391,945 | 1/1946 | Christenson | 224/40 |
| 2,537,441 | 1/1951 | Burri | 224/32 A |
| 2,717,162 | 9/1955 | Walters | 403/104 |
| 2,776,790 | 7/1957 | Zbikowski . | |
| 3,301,448 | 1/1967 | Inoue | 224/32 A |
| 3,779,435 | 12/1973 | Niemann | 224/32 A |
| 3,837,545 | 9/1974 | Rogers, Jr. | 224/32 A |
| 3,910,471 | 10/1975 | Niemann | 224/39 |
| 3,934,770 | 1/1976 | Larsen | 224/32 A |
| 4,258,870 | 3/1981 | Edelson | 224/32 A |
| 4,266,702 | 5/1981 | Jackson et al. | 224/32 A |
| 4,349,138 | 9/1982 | Bruhn | 224/32 A |
| 4,350,361 | 9/1982 | Fujii | 224/32 A |
| 4,562,944 | 1/1986 | Jackson et al. | 224/32 A |

FOREIGN PATENT DOCUMENTS

| | | | |
|---|---|---|---|
| 184071 | 12/1955 | Fed. Rep. of Germany | 224/38 |
| 955200 | 12/1956 | Fed. Rep. of Germany | 224/39 |
| 2834439 | 2/1980 | Fed. Rep. of Germany | 224/32 R |
| 369441 | 3/1939 | Italy | 224/41 |
| 316315 | 9/1956 | Switzerland | 224/39 |
| 18996 | of 1897 | United Kingdom | 224/40 |
| 25817 | of 1897 | United Kingdom | 224/40 |
| 462138 | 3/1937 | United Kingdom . | |
| 2168659 | 10/1984 | United Kingdom . | |

Primary Examiner—Linda J. Sholl
Attorney, Agent, or Firm—Paul M. Craig, Jr.

[57] ABSTRACT

An attachment for a load carrier, such as a bicycle rack which permits the user to adapt the same to changes in the configuration of the load, and which includes two pairs of tubular members which extend generally transversely to the carrier and generally L-shaped tubular support arms which are telescopically associated with a corresponding tubular member, whereby the support arms extend in opposite directions from the free ends of the corresponding pair of tubular members; the support arms which are angularly displaceable and extensible relative to the corresponding tubular member, can be locked against axial and angular movements so as to be held in their selected position; each pair of tubular members is clamped to a frame member of the load carrier. In a particularly preferred embodiment, the free end of each support arm terminates in a generally U-shaped support hook whereby the L-shaped support arm with its support hook are arranged in substantially the same plane.

27 Claims, 2 Drawing Sheets

ARTICLE CARRIER RACK

FIELD OF THE INVENTION

This invention broadly relates to new and useful improvements in load carrying racks for vehicles. When appropriately attached to a vehicle, such as a bicycle, the utility of the vehicle is substantially enhanced It should be understood from the outset that although the majority of the ensuing description is directed toward application of my improved rack to light weight vehicles such as bicycles and motorcycles, the advantages of my unique rack are in no way limited to the particular device to which it may be attached. The application to bicycles is concentrated on because they are notoriously poor in the ability to easily carry loads of varying bulk and dimensions. Thus my expandable lightweight rack offers the most improvement in utility to such a vehicle. Just how this is done will be fully described later. For now, the expandable feature is mentioned to assist in adequately portraying the scope, and therefore the many potential fields of this invention. The list of possible uses for this invention is virtually endless The numerous types of loads capable of being carried by this unique method and apparatus make this invention capable of application to nearly any field of endeavor where it is desired to transport or secure in place items whose size and volume may vary across a wide range from load to load.

A few examples of items easily carried with this invention are: wicker baskets, back packs, bulky grocery bags, brief cases, tool boxes, skis, surfboards, any large flat based object that needs a wide support for stability, and a myriad of other items too numerous to mention specifically.

As has been stated, this invention is attachable to any vehicle or fixed frame thus making it applicable to at least the broad industries of transportation, manufacturing, warehousing, building, and recreation. The majority of this specification will describe in detail a preferred application of the invention in the recreational industry. That application involves the attachment of the rack to a light-weight recreational bicycle dramatically and conveniently improving its load carrying capacity. However, it is to be understood that the scope of this invention far exceeds the particular industrial embodiment herein described and is limited only by the attached claims.

BACKGROUND OF THE INVENTION

Various types of bicycle carrier racks are known in the prior art. It is a well recognized axiom that the reduction of weight of all elements of such a self-propelled vehicle is of primary importance. Ease of attachment of the carrier to the vehicle has also received considerable attention by prior practitioners. With these two obvious goals in mind the prior art seems to have missed a very important point. How does the load fit to the carrier? For example, "basket" type carriers have been known for nearly as long as bicycles. But what do you do if your load does not fit in the basket? It is well within the purview of one skilled in the art to provide saddle bag carriers for motorcycles and the like. But what do you do if your load does not fit in the bag?

The load carrying capability of light-weight vehicles has, heretofore, not been utilized to its fullest extent. For example, the exact distance from one end to the other of many prior carrier racks fixes the maximum size of the load that can be carried. The exact fixed width of the prior carriers limits the width of an object that can be stably carried upon them.

It can be seen that present article carriers suffer from many disadvantages. My invention, particularly applicable to bicycles, but not limited thereto, overcomes all the previously mentioned disadvantages by providing a significantly improved adjustable load carrying capability while maintaining as good or better a strength to weight ratio and ease of attachment as any other known system.

SUMMARY OF THE INVENTION

A major goal of this invention is to provide means to quickly, easily, securely, and safely carry any object or group of objects without regard to their varying sizes, weights, or dimensions. Another goal is to provide means for easily adjusting the actual shape and size of the carrier so as to match it to the shape and size of each object or group of objects. Another goal is to make these adjustments in such a way that a strong, rigid, and stable base and/or containment is created for any size load. A more specific goal is to substantially reduce or eliminate entirely delays and damage caused by present systems when the load shifts or falls from the carrier. Another specific goal is to free the user from the frustrating and exasperating task of wrestling with and tying down a load which simply does not fit the carrier. This allows users to concentrate on the things only they can do, such as enjoying the ride or working in an environment free from fear of falling objects.

It will be seen that the present invention meets or exceeds all the above goals. Briefly, four easily rotatable and extendable L shaped arms are provided on a carrier rack to accommodate the load. In addition the remote ends of each of the arms is formed with a hook which can support the load directly or accommodate extensible "shock" cords should they be necessary to additionally secure the load.

By utilizing light-weight aluminum rods for the arms and aluminum tubes for the arm mounts, simplicity, precision, light weight, strength, ease of manufacture, corrosion resistance, and low cost are assured.

This invention, through the designed placement and orientation of the special support arms, allows load attachment to be done with greater speed and accuracy than any current method. Since time tested and proven principles of geometry and mechanics were used to derive the dimensions of the various links and arms of the mechanism of this invention a predictable stability and rigidity is assured. The exclusive use of non-corrosive materials such as aluminum guarantees a long life.

This invention additionally utilizes unique adaptations of otherwise conventional internally tapered flange nuts to acheive simultaneous locking of both the extension and rotation of the unique support arm.

Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
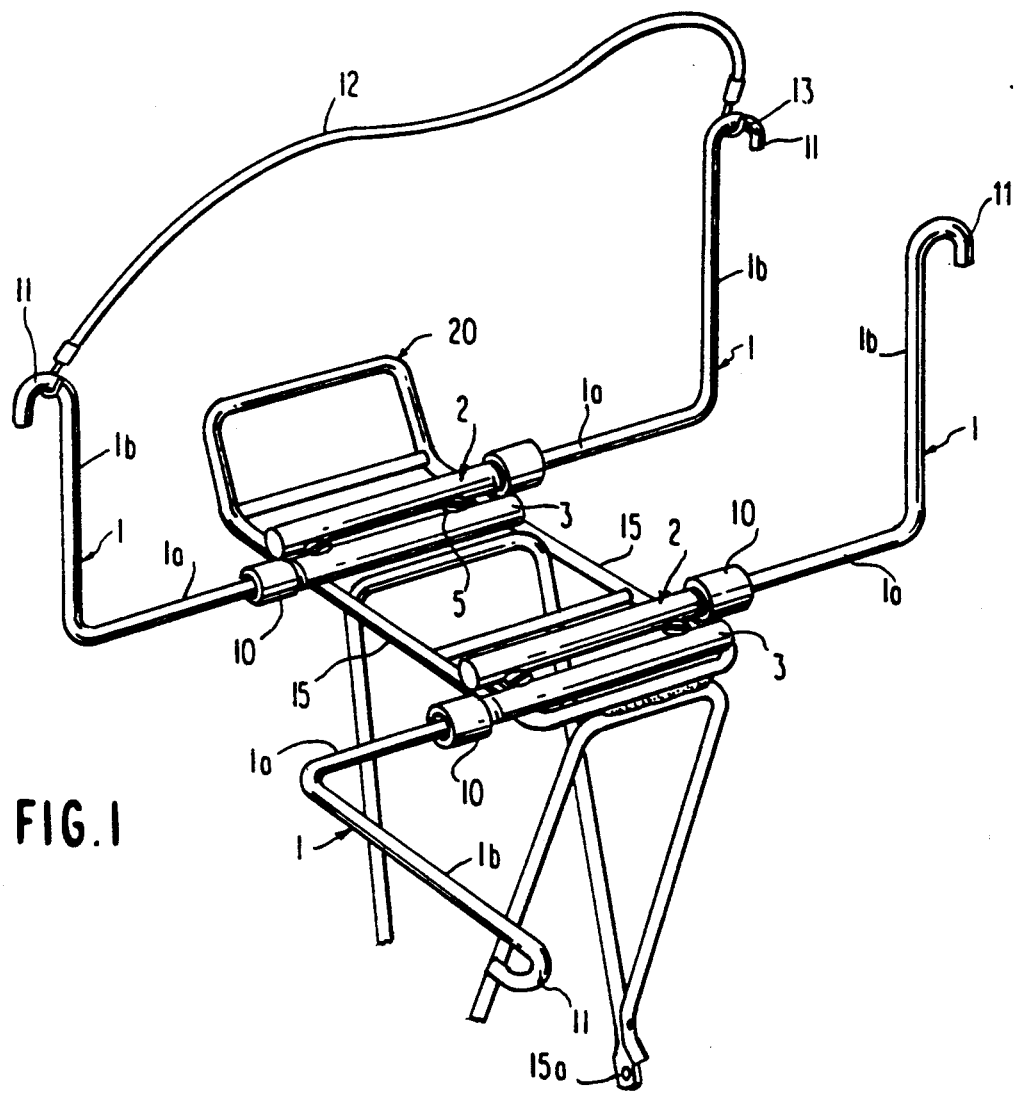
FIG. 1 is a perspective view of the invention showing three of the four support arms rotated to the up position and one rotated to the horizontal position.

First turning to FIG. 1 there is shown a rear bicycle carrier assembly generally designated by reference numeral 20. The carrier assembly 20 which may be of any known type, is mounted in a conventional manner as at 15a to the bicycle or other support vehicle. The details of this connection to the support vehicle form no part of this invention. The two parallel horizontal longitudinally extending side bars 15 of the carrier assembly 20 are used to mount two cross tube assemblies generally by reference numeral 2 of my invention atop and perpendicular to the side bars 15. This rigid mounting is accomplished by means of screws 5 which form part of an overall mounting assembly fully shown and described in conjunction with FIG. 3. Each cross tube assembly 2 consists of two rigidly joined parallel hollow circular tubes 3 (FIGS. 1-3) which will be more fully described in conjunction with FIG. 2. Slip fit inside each hollow tube is a straight leg 1a of a generally L shaped support arm 1 of circular cross-section. The fit is such that each straight leg is easily rotatable in and extensible from its respective cross tube 3 yet is firmly supported within that tube. The other leg 1b of the generally L shaped support arms is not straight but rather formed with U shaped hooks 11 bent so that the overall arm 1 is coplanar and the hooks are formed in a direction away from the other (straight) leg 1b of the L. The net result is that the hooks face upward if the support arm 1 is rotated so that the L is turned downward and the hooks face down if the support arm 1 is rotated up.

The hooks 11 are thus formed so as to not interfere with a boxlike load placed between the upwardly rotated arms. By the same token when the arms are turned downward the hooks may actually be used to support the bottom edge of a flat sheet-like object such as a pane of glass or piece of plywood. One skilled in the art will recognize that this method of supporting a sheet like object on its edge will lower its center of gravity to the lowest possible point thus promoting the overall stability of the vehicle and its load. Also of primary importance is the fact that the support arms 1 may be slid in and out of the cross tubes 3 as well as rotated with respect thereto. It will be noted that if a box or the like is too wide to fit between the upwardly turned support arms 1 all that need be done is to extend the support arms in their respective cross tubes until they form a cavity of sufficient width for the item. The independent extensibility of each of the support arms 1 also allows the sideways shifting of the load to some extent before it is secured by locking the support arms. This allows the center of gravity of the load to be placed directly above the rear or front wheel of the bicycle which in turn greatly enhances the stability.

The independent extensibility is also extremely useful in securing an irregularly shaped object such as a duffel bag or a back pack. The object is placed atop the cross tubes 3 so as to balance from side to side with the support arms loosened. Then each arm 1 is individually snugged up against whatever portion of the bag happens to be nearby and locked in position. The result is a custom carrier that performs in every way as though it were designed specifically to carry that particular irregularly shaped item! If the item happens to be too tall to be adequately supported on its sides by the upwardly turned support arms 1 and its bottom by the cross tube assemblies 2 and their supporting carrier elements, the U shaped hooks 11 may be be used to easily attach additional stretchable cords 12 with complementary hooks 13 up one side over the top and down the other side. Another awkward case occurs if the item is too wide to fit between the support arms 1 in their maximum extended position. The solution in this case is to rotate the support arms to the horizontal position to provide the maximum possible base support area. Then the cords 12 may be strung out, up, over, down, and back around the load. This still provides a very stable support because the horizontal support arms provide an extremely large support base.

Figure 2:
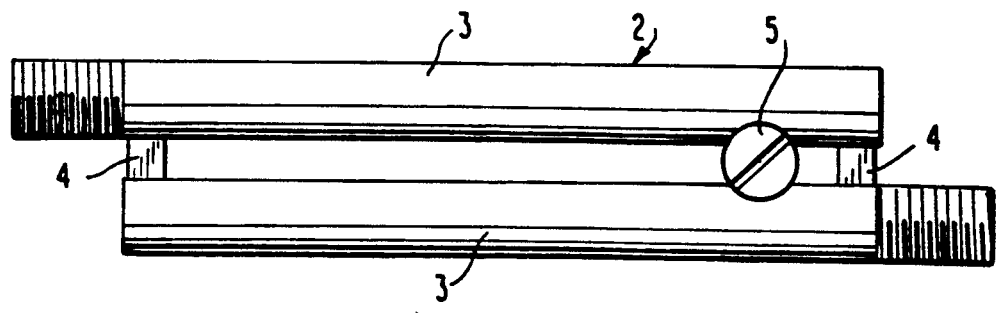
FIG. 2 is a top plan view of one of the two cross tube assemblies used in the invention of FIG. 1.

FIG. 2 shows the details of how a cross tube assembly 2 is formed from two identical cross tubes 3. Each tube 3 is externally threaded on its outwardly extending end. Then two such tubes are rigidly joined together by fastening such as with welds as shown at 4. The fastening may be done with commercial adhesives or any other known means that provide a strong secure rigid attachment of one tube to the other. The cross tubes are joined so that they are parallel to one another and their threaded ends face in opposite directions. Preferably a gap is left between the tubes of sufficient width to allow clearance for an attaching screw 5.

Figure 3:
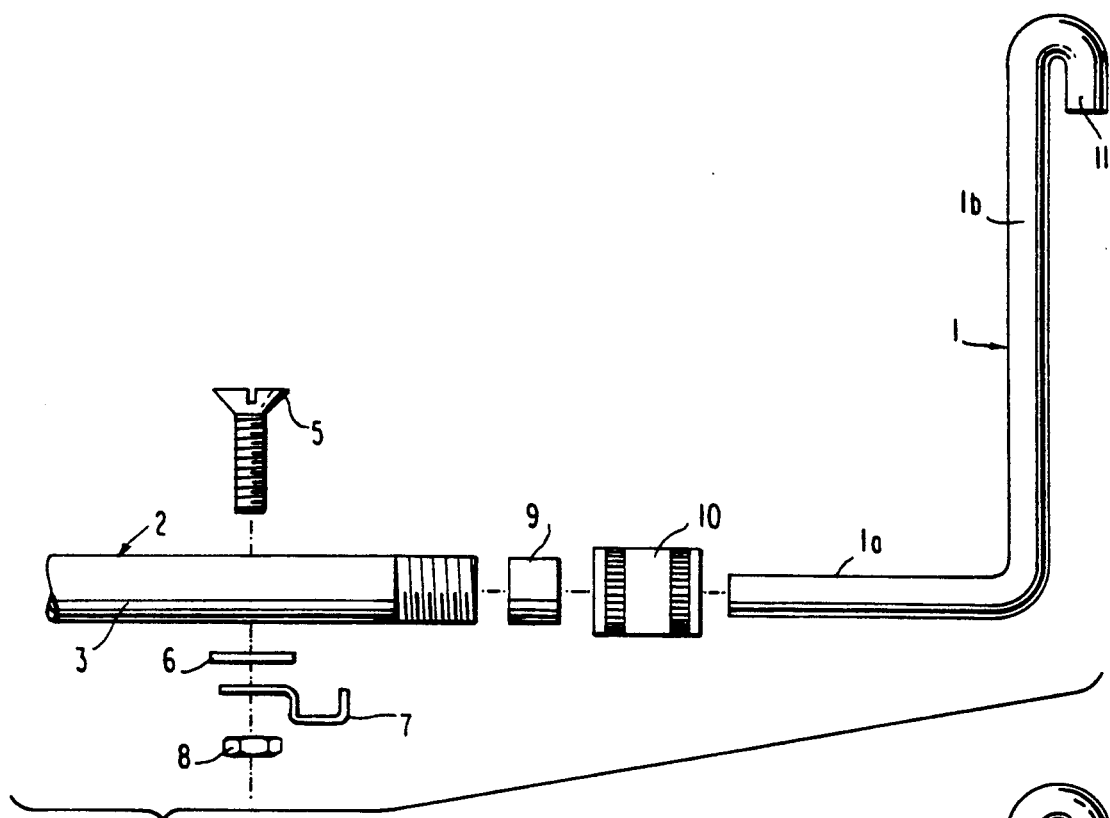
FIG. 3 is an exploded side view of the invention showing a cross tube with its mounting bracket assembly and a support arm with an attachment assembly for adjustably mounting it to a cross tube.

FIG. 3 shows the means for attaching the cross tube assemblies 2 to the carrier structure 15. This simply consists of screw 5, washer spacer 6, clamp 7, and nut 8. The U shaped portion of clamp 7 is arranged to surround one of the side bars 15 of carrier 20 and in turn secures the cross tubes with the screw and nut in a manner well known in the art. Also shown is the prefered means of rotatably and extensibly connecting the support arm 1 to a cross tube 3. The straight rod portion of support arm 1 freely inserts through knurled tapered nut 10 and plastic ring 9 into cross tube 3. When the internally tapered nut 10 is tightened to the threaded end of the cross tube the internal taper causes the plastic ring 9 to be compressed tightly against the support arm rod 1 thus effectively locking it in position.

Figure 4:
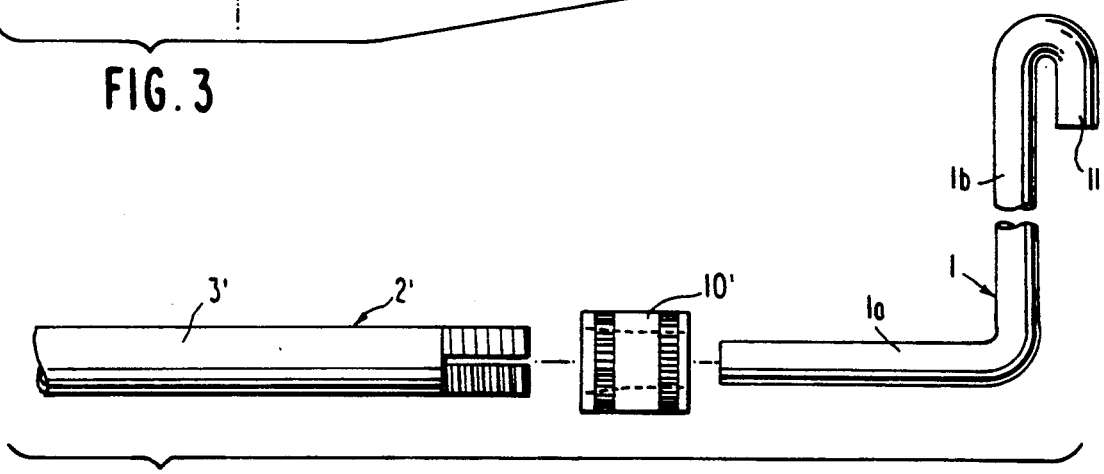
FIG. 4 is an exploded side view of the invention showing a modified support arm to cross tube attachment assembly.

FIG. 4 shows an alternate method of releasably locking the support arm rod 1 to the cross tube 3'. The cross tube is split longitudinally of its threaded portion so that tightening the internally tapered nut will compress modified cross tube 3' itself against the support arm rod 1. This method does not require the plastic compression ring 9 of FIG. 3.

Figure 5:
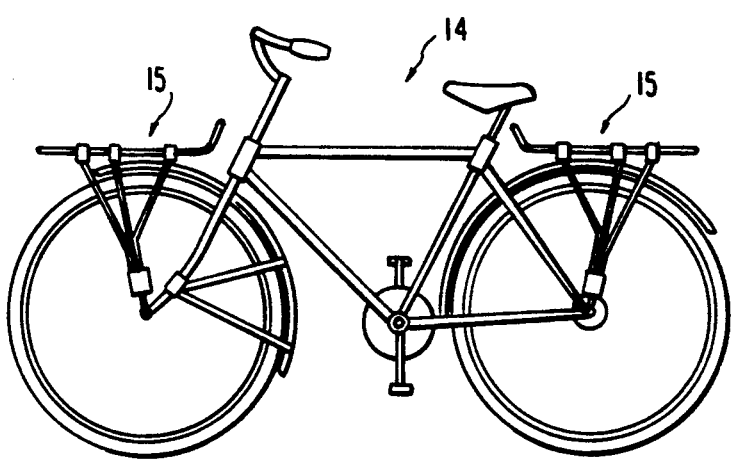
FIG. 5 is a side view of a prior art bicycle carrier mounted on a bicycle such as might be used to practice the principles of this invention.

FIG. 5 is an illustration of one prior art carrier 15 mounted to a bicycle 14 which would be suitable for mounting the carrier attachments 2 including cross tubes 3 or 3' and support arms 1 of this invention.

From the foregoing description, one skilled in the art can easily ascertain the essential characteristics of this invention, and without departing from the spirit and scope thereof, can make various changes and modifications of the invention to adapt it to various usages and conditions. I therefore do not wish to be limited to the details shown and described herein but intend to cover all such changes and modifications as are encompassed by the scope of the appended claims.

I claim:

1. An adjustable load carrier attachment adapted to be attached to a load carrier means having frame members defining a load-supporting surface of predetermined width and length for supporting thereon loads, comprising at least one pair of substantially rectilinear hollow tubular members disposed in a plane substantially parallel to that of the load-supporting surface and within the area defined by the latter, each tubular member extending across the load-supporting surface generally transversely to the length direction, said hollow tubular members being internally unobstructed over at least nearly their entire length and spaced from one another in the length direction in substantially parallel relationship, being adapted to be secured to frame members of said load carrier means within the area of the load-supporting surface, and means for adjustably changing the configuration of the load-supporting surface by said attachment including one support arm for each of the tubular members of a pair of tubular members, each support arm being telescopically and coaxially received within a respective one of the pair of tubular members so as to be axially extensible and coaxially freely rotatable relative to the respective tubular member, the support arms associated with a pair of tubular members extending in opposite directions from ends of the pair of tubular members, and locking means for securing each support arm in its selected position relative to its corresponding tubular member against axial and rotational movement.

2. The attachment of claim 1, wherein the load carrier means is a carrier rack for a bicycle.

3. The attachment of claim 1, wherein each of said support arms may be rotated and locked to lie entirely in a horizontal plane thus providing an extremely large support base area for said load.

4. The attachment of claim 1, wherein said locking means comprises an externally threaded portion on a respective tubular member, a plastic compression ring, and an internally tapered locking nut.

5. The attachment of claim 1, wherein said locking means comprising a split portion in the end area of the externally threaded tubular members and an internally tapered locking nut.

6. An adjustable load carrier attachment according to claim 1, which includes two such pairs of tubular members located within the length area of the carrier means, each pair having two support arms which extending in opposition directions from ends of a respective pair.

7. An adjustable load carrier attachment according to claim 6, wherein the tubular members of a respective pair of tubular members are disposed in substantially side-by-side relationship with respect to one another.

8. The attachment of claim 7, wherein four support arms are provided, each being generally L-shaped so that angular displacement thereof enables the remote portion of each L to provide either side or base support for a load.

9. The attachment of claim 8, wherein the remote portion of each L additionally includes an approximately U-shaped hook portion.

10. The attachment of claim 9, wherein said hook portions are used for attaching complementary hooks at the ends of an extensible cord to provide an additional hold down support for a load.

11. An adjustable load carrier attachment according to claim 1, wherein the tubular members of a respective pair of tubular members are disposed in side-by-side relationship with respect to one another.

12. An adjustable load-carrying attachment according to claim 1, wherein the support arms are generally L-shaped with a generally U-shaped hook portion at the free end thereof.

13. The attachment of claim 12, wherein said hook portions are used for attaching complementary hooks at the ends of an extensible cord to provide an additional hold-down support for a load.

14. A load-carrying attachment for a bicycle rack of given fixed length and width and having frame members defining said length and width, said attachment being operable to permit a change in the load-carrying configuration of the bicycle rack and comprising two pairs of substantially parallel tubular members spaced from one another in the length direction within the area defined by said frame members and extending across the width of the bicycle rack generally transversely to the length direction, each tubular member having a length at least equal to the width of the bicycle rack and being internally unobstructed substantially over its length, one substantially L-shaped support arm telescopically and rotatably received within a corresponding tubular member to enable axial movement of the support arm relative to the associated tubular member, as well as angular adjustment through 360°, releasable locking means for releasably locking each support arm in its selected position relative to its associated tubular member, and attaching means to enable attachment of the tubular members of the load-carrying attachment directly to frame members of the bicycle rack within the area defined by said frame members, the support arms of a respective pair of tubular members extending in opposite directions from respective ends of the corresponding tubular members.

15. A load-carrying attachment according to claim 14, wherein the tubular members of a respective pair of tubular members are fixed with respect to one another and include common attaching means.

16. A load-carrying attachment according to claim 15, wherein the attaching means includes clamping means for securely clamping each pair of tubular members to a frame member of the bicycle rack.

17. A load-carrying attachment according to claim 16, wherein the clamping means extends between and cooperates with the two tubular members of a pair of tubular members.

18. A load-carrying attachment according to claim 16, wherein each support arm includes at its free outer end a generally U-shaped hook portion.

19. A load-carrying attachment according to claim 18, wherein the L-shaped support arm and its hook portion are substantially coplanar.

20. A load-carrying attachment according to claim 19, wherein the two pairs of tubular members are secured independently of one another to the bicycle rack.

21. A load-carrying attachment according to claim 14, wherein each support arm includes at its free outer end a generally U-shaped hook portion.

22. A load-carrying attachment according to claim 21, wherein the L-shaped support arm and its hook portion are substantially coplanar.

23. A bicycle rack comprising frame means having several frame members for carrying a load on its load-supporting surface of given width and length defined by said frame members, said frame members including two longitudinal frame members defining said width and at least one pair of hollow tubular members extending generally parallel to one another and transversely to the longitudinal frame members across the width of the load-supporting surface, said tubular members being fixedly secured directly tot he longitudinal frame members of the frame means, one generally L-shaped support arm for each tubular member telescopically and freely rotatably accommodated within a respective tubular member in such a manner as to enable unobstructed relative axial movement over substantially the entire length of the respective tubular member as well as angular displacement through 360° between a respective support arm and its associated tubular member, said support arms extending in opposite directions from ends of the tubular members of a respective pair, and releasable locking means for locking the support arms in their selected axial and angular positions relative to the tubular members.

24. A load-carrying attachment according to claim 23, wherein two such pairs of tubular members each having two support arms are provided, with each pair of tubular members secured independently of one another to the frame members of the bicycle rack.

25. A load-carrying attachment according to claim 24, wherein the attaching means includes clamping means for securely clamping a pair of tubular members to a frame member of the bicycle rack.

26. A load-carrying attachment according to claim 25, wherein the clamping means extends between and cooperates with the two tubular members of a pair of tubular members.

27. A bicycle carrier according to claim 23, wherein the support arms are provided with generally U-shaped portions at their free ends.

* * * * *